United States Patent [19]
van Cang

[11] Patent Number: 4,559,553
[45] Date of Patent: Dec. 17, 1985

[54] DEVICE AND APPARATUS FOR THE SELECTIVE ACQUISITION OF SIGNALS, PARTICULARLY TELEVISION SIGNALS, WITH A VIEW TO THEIR CHARACTERIZATION BY A DIGITAL COMPUTER

[75] Inventor: Luc P. van Cang, Paris, France

[73] Assignee: Thomson-CSF, Paris, France

[21] Appl. No.: 475,971

[22] Filed: Mar. 16, 1983

[30] Foreign Application Priority Data

Mar. 19, 1982 [FR] France ................................ 82 04753

[51] Int. Cl.[4] ............................................. H04N 9/62
[52] U.S. Cl. .................................................... 358/10
[58] Field of Search ........................... 358/10, 21 V, 13

[56] References Cited

U.S. PATENT DOCUMENTS 4,479,146 10/1984 Cohn ..................................... 358/10

FOREIGN PATENT DOCUMENTS 2408959 8/1979 France .

OTHER PUBLICATIONS

Wireless Workd, vol. 81, No. 1469, Jan. 1975, Haywards Heath/Sussex (GB) J. Schaffer.
Telecommunications & Radio Engineering, vol. 34/35, No. 5, Mai 1980, Silver Spring, Maryland (U.S.) M. I. Krivosheyev et al.
Journal of the SMPTE, vol. 83, No. 9, Sep. 1974, New York (U.S.) G. A. McKenzie.
Tekscope, vol. 12, No. 2, 1980, Voorschoten (NL) J. Lewis.

Primary Examiner—Richard Murray
Attorney, Agent, or Firm—Oblon, Fischer, Spivak, McClelland & Maier

[57] ABSTRACT

The device comprises a generator of the current address of the signal appearing at the input of the device, a unit for sampling the signal received by the device and a comparator connected by an input to the output of the current address generator, another input of the comparator receiving the address of the signal which is to be acquired and the output of the comparator supplying a control signal for the sampling unit in order to authorize it to acquire the current signal present at the input of the device, when the address of the current signal is equal to the address of the signal which is to be acquired.

3 Claims, 5 Drawing Figures

DEVICE AND APPARATUS FOR THE SELECTIVE ACQUISITION OF SIGNALS, PARTICULARLY TELEVISION SIGNALS, WITH A VIEW TO THEIR CHARACTERIZATION BY A DIGITAL COMPUTER

BACKGROUND OF THE INVENTION

The present invention relates to a device for the selective acquisition of signals which succeed one another in time and which can be located by the addresses associated with their relative positions, with a view to their characterization by a digital computer. It also relates to a television signal acquisition apparatus using the said device. The invention is more specifically applicable to the characterization of television signals.

The characterization of a signal and particularly a television signal is conventionally carried out by standard measuring devices, such as osciloscopes, or more specialized devices, such as vectorscopes, noise meters, video voltmeters, etc. Most of these devices can be replaced by a signal acquisition device coupled to a digital computer and to a graphic display means, which in the present state of the art represents a significant reduction in costs and an improvement in performance levels.

However, when the acquired signal lasts for a relatively short time of approximately 100 microseconds, digital computers cannot give direct access to the signal, transmitted to them by the acquisition device. These problems, which are mainly encountered in television, are mainly due to the analog format of the signal, whose duration is 64 microseconds in the 625 line system, to the extensive spectrum thereof and to the limited processing speed of existing digital computers, which are limited in their performances both with respect to the acquisition levels, the orienting of the data in the memory and the processing times, and with regards to the read-out of the results by the instruction performance times, which would appear to be long, i.e. 10 microseconds, compared with the duration of the signal.

However, high speed analog-digital conversion means are known enabling a computer to acquire a portion of a television signal. Such means generally comprise a converter able to work on samples composed of a reduced number of bits, generally 8 bits, at high frequencies of approximately 25 MHz and a buffer store able to store one or two television lines. The acquisition of the signal takes place in real time on one or both lines and a transfer of the stored samples into the buffer store takes place to the computer at a much lower speed. Such means do not permit a very faithful acquisition of the signal, particularly measuring and test signals, which are necessary for a precise characterization of the signal.

SUMMARY OF THE INVENTION

The problem of the invention is to obviate the aforementioned disadvantages with the aid of a device for the selective acquisition of signals which succeed one another in time and which enables a digital computer to process any random signal received by the device in order to recognize a certain number of characteristics of the signal, particularly the parameters enabling it to accurately specify either its amplitude, or its frequency, or its phase relative to another signal, or the characteristics times of a transient, or its noise characteristics.

The present invention therefore specifically relates to a device for the selective acquisition of signals which succeed one another in time and which can be located by addresses associated with their relative positions with a view to their characterization by a digital computer, wherein it comprises a generator of the current addresses of the signals appearing at the input of the device, a sampling unit for the signals received by the device and a comparator connected by an input to the output of the current address generator, another input of the comparator being connected to a programmable address counter, the content of said programmable address counter, describing the address of the signal which has to be acquired, being modified by said computer by means of an address bus coupling said programmable address counter to said computer, the output of the comparator supplying a control signal of the sampling unit in order to authorize it to acquire the current signal present at the input of the device when the address of the current signal is equal to the address of the signal which has to be acquired, the sampling unit comprising a sampler, said device for the selective acquisition further comprising a control device, controlled by said computer and the current address generator in order to supply preprogrammed control signals to the sampler, and an analog-digital converter connected to the output of the sampler, said analog-digital converter supplying a signal for the incrementation by one unit of the content of the programmable address counter at the end of the conversion cycle.

The invention also relates to an application of the acquisition device to the construction of a television signal acquisition apparatus.

These arrangements are particularly advantageous because they permit a precise sampling of each acquired signal which, in the case of an acquisition of television signals, is translated by a fine analysis of the selected point of the television image. This analysis is selectively carried out by designating the address of the signal, or the point in the transmitted image, with the aid of a member outside the device, such as a digital computer, and the information characterizing the signal or the designated point are read once or several times by the computer connected to the device, which consequently has all its time for processing the data relative to the signal or point, whose analysis is required.

BRIEF DESCRIPTION OF THE DRAWINGS

The invention is described in greater detail hereinafter with respect to a non-limitative embodiment of a signal acquisition device designed more particularly for the acquisition of television signals formed by luminance and chrominance signals and with reference to the attached drawings, wherein show.

DETAILED DESCRIPTION OF THE INVENTION

Figure 1:
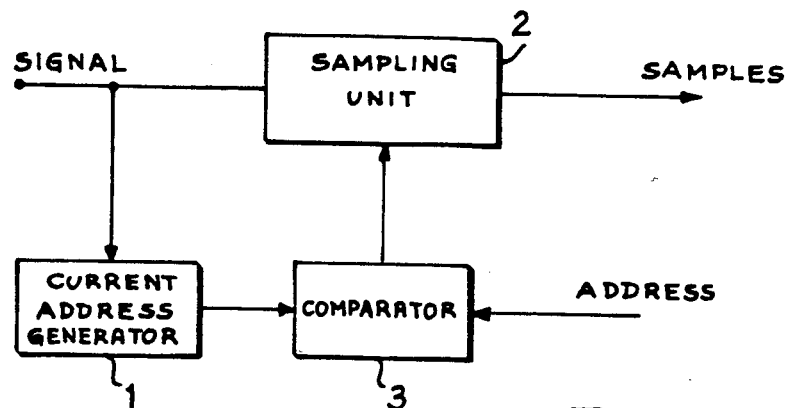
FIG. 1 a block diagram of the television signal acquisition device according to the invention.

The device for the acquisition of signals, particularly television signals, shown in FIG. 1, comprises a current address generator 1, a sampling block 2 and a comparator 3. In the present context, the term "current address" means the address of the current or actual point of the television image which is being transmitted, the associated television signal being applied to the input of the device for possible acquisition purposes. The structure of the present television signal need not be described for the purposes of the present invention, but it is merely pointed out that this signal is as defined by the international standards presently in force and a definition thereof can be found in the book entitled "Radiotechnique et Television", pp. 186 to 190, by Bogdan Grabowski, published by Societe DUNOD (Paris). This signal is transmitted in accordance with a sequence corresponding to the analysis of the image by a member outside the device and which can be a television camera or some other generator. It is applied to the respective inputs of the current address generator 1 and the sampling unit 2. At a given time, the current address generator 1 calculates for the television signal received, the address of the point of the image corresponding thereto and transmits this address to an input of comparator 3. At another input, comparator 3 receives the address of the designated point in the image for which a characterization of the corresponding television signal is required, so as to compare this address with the current address supplied by the current address generator 1. The result of this comparison is transmitted to a control input of sampling unit 2. When the latter is controlled by comparator 3, the television signal present at the input of sampling unit 2 is taken into account by the latter and is converted into a sequence of digital samples.

The details of the construction of the device shown in FIG. 1 will now be described with the aid of the embodiment of the invention shown in FIG. 2. In the latter, the current address generator 1, shown within a dotted line rectangle, comprises an input selector 4, a sync separator 5, an internal clock control device constituted by a phase comparator 6, an oscillator 7 and a programmable horizontal address counter 8, together with a programmable vertical address counter 9. Input selector 4 comprises a plurality of inputs, each of which is connected to the respective outputs of television signal generators, such as not shown cameras, which can be selectively connected to the input of the device. The television signal transmitted by the selective signal generator is received at the input of a sync separator 5, which separates the line and frame sync pulses from the television signal. The line sync pulses from separator 5 are applied to an input of phase comparator 6, which receives at another input pulses of the same frequency as the line sync pulses supplied by counter 8. Counter 8 comprises ten flip-flops circuits and has a capacity of 2048. It advances with the timing of the signal supplied by oscillator 7, whose frequency in the present case is 32 MHz. The clock pulses supplied by counter 8 consequently have a cycle of 64 microseconds, which corresponds to the duration of the standard television picture scanning line. Comparator 6 compares the pulses of the signals transmitted by counter 8 with the phase of the line sync pulses of the television signal received in order to supply a control signal for adjusting the phase of the signals emitted by oscillator 7, so as to cancel out the phase swing between the sync pulses received and the pulses supplied by counter 8. The pulses supplied by counter 8 are also applied to the input of vertical counter 9 in order to permit the latter to advance with the timing of the line sync pulses of the television signal and to count the image lines received by the device. In the present embodiment, counter 9 comprises ten flip-flop circuits and is reset by frame sync resetting pulses supplied by sync separator 5 every 625 lines in order to be able to operate with a television system consisting of 625 line picture frames. The outputs of counters 8 and 9 are respectively connected to the first inputs of comparators 3H and 3V forming comparator 3 and consequently transmit to the inputs of these comparators, the addresses of the current image point within the television image. The address position of the line is supplied by counter 9 and the position or address of the point on the line is supplied by counter 8.

Figure 2:
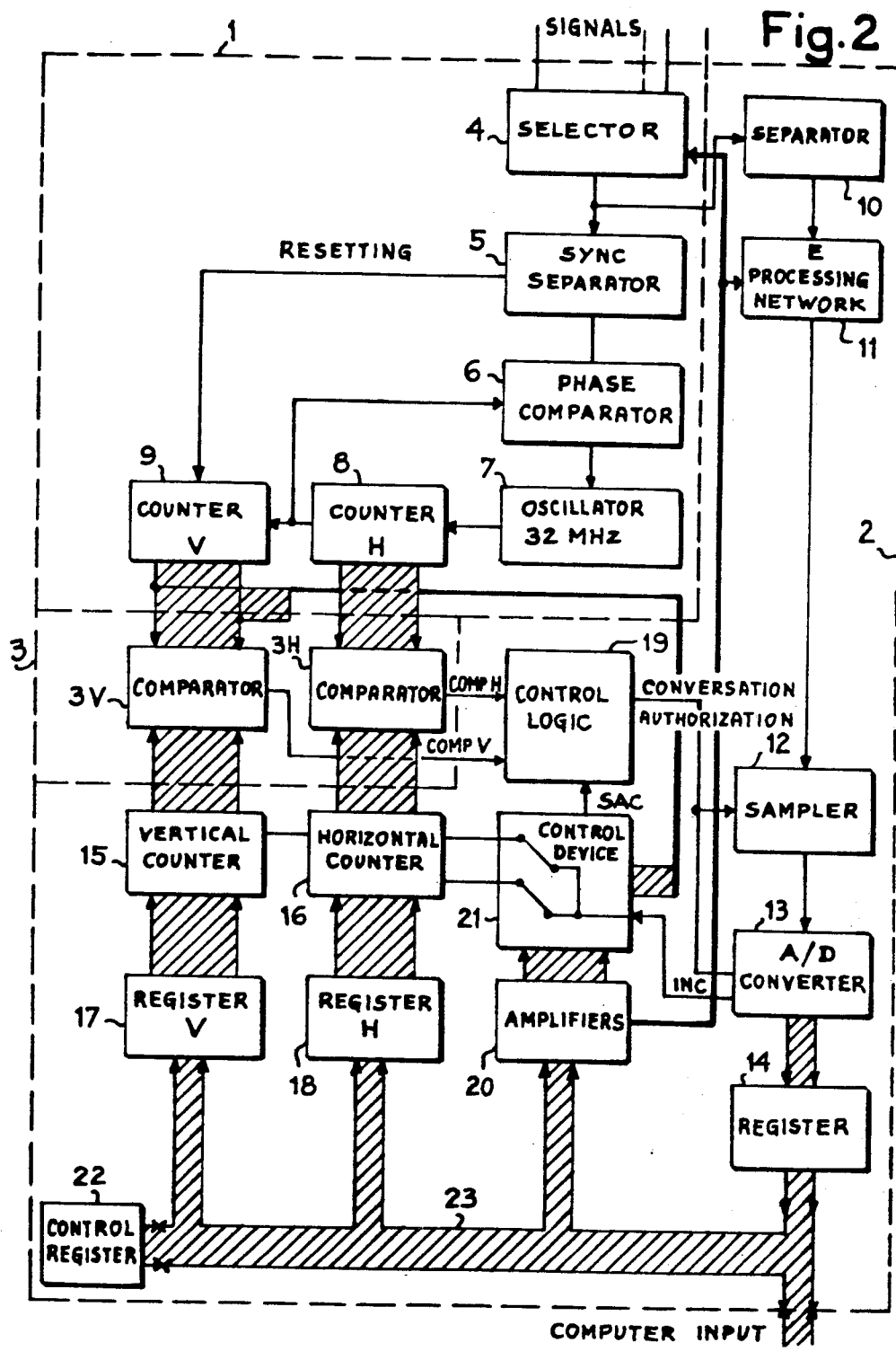
FIG. 2 a detailed representation of the elements forming the device of FIG. 1.

Sampling unit 2 is shown within the dotted line block of FIG. 2. It comprises a television signal separator 10, a network 11 for processing and bringing to size or format the television signal, a sampler 12, an analog-digital converter 13 and a register 14. Sampling unit 2 also comprises programmable address counters 15, 16, whose programmable inputs are respectively connected to the outputs of registers 17, 18, and whose outputs are connected to second inputs of comparators 3V and 3H respectively, a control logic 19, control amplifiers 20, a device 21 for controlling the advance of counters 15, 16 and for controlling control logic 19, as well as a control register 22. A bidirectional transmission bus 23 for the signals connects the inputs of registers 17, 18 and amplifiers 20, as well as the outputs of control registers 22 and register 14 bringing about the connection of the device to the address and data bus of the external, not shown computer. The television signal separator 10 has its input connected to the output of selector 4 and consequently receives the television signal selected by the input selector. The output of selector 4 is connected to the input of network 11, whose components are shown in FIG. 3.

Figure 3:
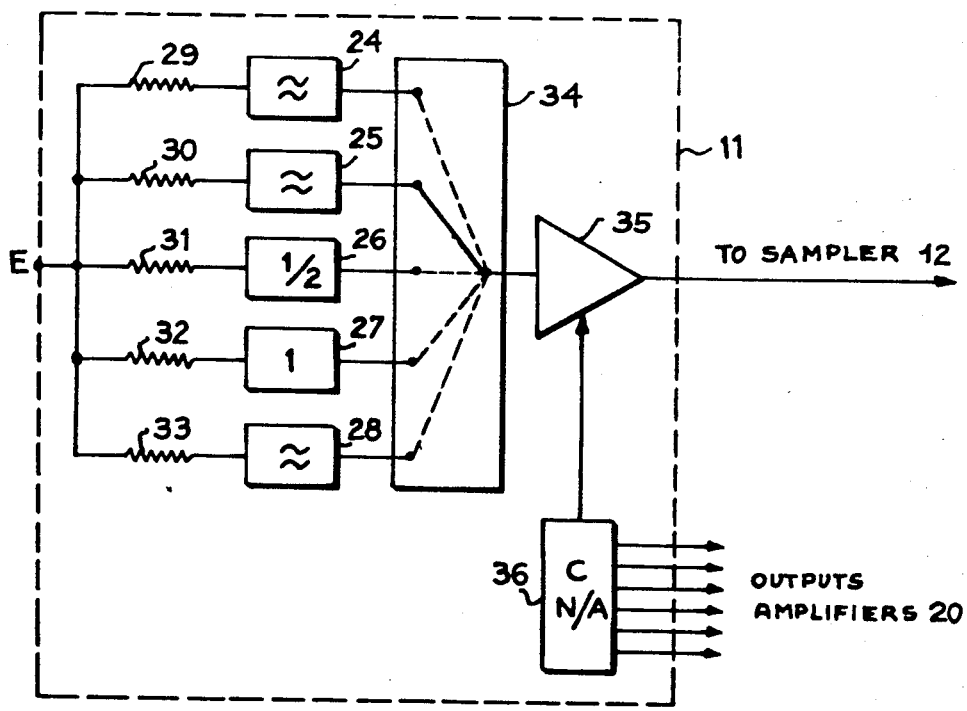
FIG. 3 an ambodiment of a network for processing and putting into shape or format the signal of FIG. 2.

The processing and sizing network of FIG. 3 comprises a low-pass filter 24, a high-pass filter 25, an attenuator 26 of attenuation ratio $\frac{1}{2}$, an attenuator 27 of attenuation ratio 1, and a low-pass filter 28. The inputs of the aforementioned components are respectively connected to input E of network 11 across the respective resistors 29 to 33. The respective outputs of the aforementioned components 24 to 28 are connected to the respective inputs of a selector 34, whereof the output is connected to the input of a variable gain amplifier 35 controlled by the output of a digital-analog converter 36. The inputs of converter 36 are respectively connected to the outputs of control amplifiers 20. Network 11 can therefore be directly controlled, on the basis of control information from a computer outside the device in such a way as to select the desired signal processing mode, by positioning the corresponding input of selector 34 on one of the correction components 24 to 28 and by adjusting the output level of the digital-analog converter 36, in order to adjust the gain of amplifier 35. The signal from amplifier 35 is then applied to the input of sampling device 12 of FIG. 2, whose control input is connected to the output of control logic 19 and supplies a control signal, when a conversion authorization is given by comparator 3 or control device 21.

Figure 4:
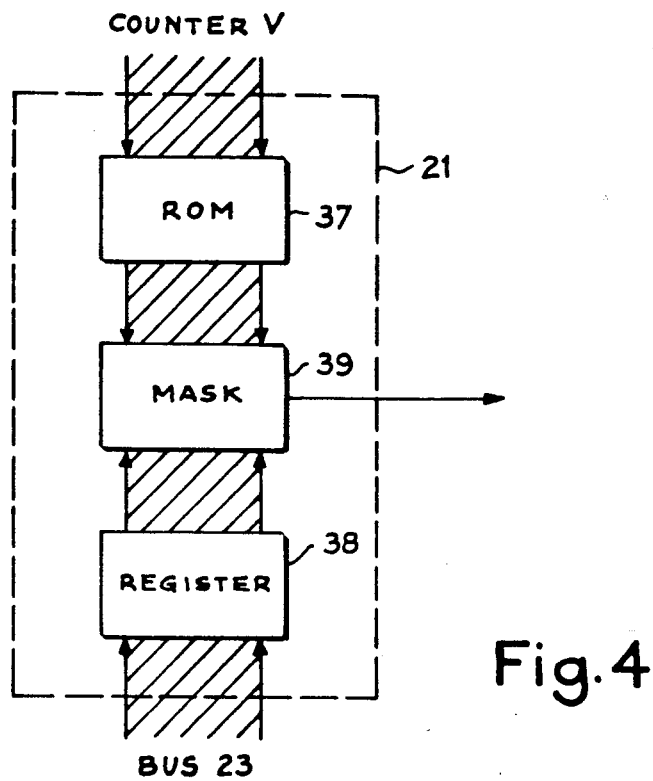
FIG. 4 the decoder of the control signals of FIG. 2.

The control device 21 is shown in FIG. 4 and comprises a read-only memory or ROM 37 addressed at its inputs by vertical counter 9, an operation authorization register 38 connected by its inputs to bus 23 connecting the device to the external computer, and a masking circuit 39 having its first inputs connected to the outputs of memory 37 and its second inputs connected to the outputs of register 38.

Memory 37 contains preprogrammed conversion authorizations for the particular lines of the television image, making it possible for example to select particular test lines in each frame of the image, or carry out measurements on a complete frame. The preprogrammed authorizations appear on the output wires of memory 37 when they are appropriately addressed by counter 9. These authorizations can be validated or partly masked by masking information bits contained in register 38, which had been loaded beforehand by the computer located outside the device. The conversion authorizations are validated in per se known manner by masking circuit 39, which supplies at its output a conversion authorization signal SAC, whenever a conversion authorization supplied at an output of memory 37 is validated by the content of register 38. The conversion authorization signal SAC is transmitted to the output of the control device 21 and is intended for control logic 19.

Figure 5:
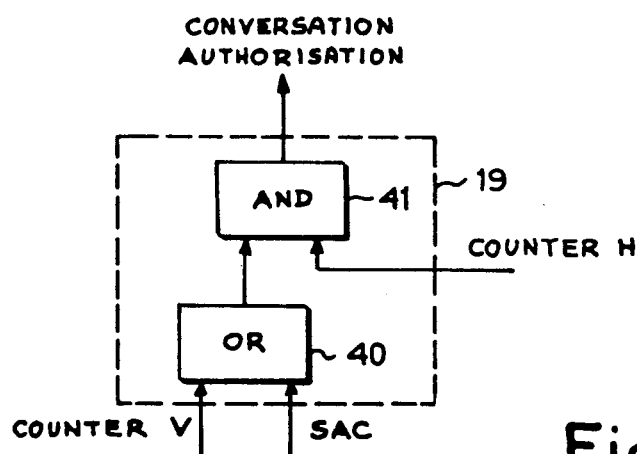
FIG. 5 a representation of the control logic of FIG. 2.

Control logic 19 is shown in FIG. 5. It comprises an OR gate 40, connected by a first input to the output of the control device 21 transmitting signals SAC, by a second input to the output of vertical comparator 3V, and by its output to a first input of an AND gate 41, whose other input is connected to the output of horizontal comparator 3H. The output of AND gate 41 constitutes the output of control logic 19, and supplies a sampling control signal whenever an address equality is detected by vertical comparator 3V or a conversion authorization signal SAC is supplied by control device 21 and horizontal comparator 3H finds an address equality between the contents of counters 8 and 16.

When the sampling device 12 is controlled by control logic 19, the sample of the signal measured by sampling device 12 is applied to the input of the analog-digital converter 13. Control logic 19 also initiates the conversion cycle of analog-digital converter 13 in order to convert the amplitude of the sample applied to the converter input into a digital quantity, which is transmitted to the input of the register 14, which serves as a buffer between the device and the external computer. At the end of its conversion cycle, analog-digital converter 13 transmits a INC signal to the programmable counters 14 or 16 in order to increment their content by one unit. This incrementation is authorized by control amplifiers 20, whose inputs receive an authorization control pulses signal transmitted by the computer outside the device.

The aforementioned device functions in the following way. The coordinates $X_i$ and $Y_i$ of the signal to be characterized are transmitted by this computer in the form of digital signals on connection bus 23 to registers 17 and 18. The television signal to be characterized is selected by selector 4 and is applied on the one hand to the input of sync separator 5 and on the other to the input of separator 10. The external computer also transmits the control bits for control register 22 in order to mask the outputs of the read-only memory 37 of control device 21 and for controlling the processing and sizing network 11. The horizontal and vertical addresses of the television signal to be characterized contained in registers 17 and 18 are transferred into programmable counters 15 and 16. Oscillator 7, which is dependent on the sync pulse supplied by sync separator 5 brings about an advance of the horizontal and vertical counters 8 and 9, which in each case supply one component of the current address of the image point being transmitted and these horizontal and vertical addresses are compared with the addresses of the desired point contained in counters 15, 16, by comparators 3V, 3H. When comparators 3H, 3V detect an equality between the current and desired addresses, they supply in each case a conversion authorization signal, respectively COMPH and COMPV, which are transmitted to the inputs of control logic 19. At the same time, ROM 37 is addressed by the outputs of the vertical counter 9, ROM 37 contains addresses of lines for which a signal characterization can be directly controlled by the computer. These lines are selected by mask 39, whose inputs receive the mask information from the computer and transmitted across the operation authorization register 38. When coincidence occurs between the bits of the mask information word and the output bits of ROM 37, a conversion authorization signal SAC is supplied by mask 39. ROM 37 and mask 39 make it possible to select several test lines inserted in each image frame and, if the memory is appropriately programmed, make it possible to carry out measurements on a complete frame, as well as frame synchronization measurements. The conversion authorizations act on the control input of analog-digital converter 13 and, whenever they appear, initiate a conversion cycle. At the end of each conversion cycle, an incrementation signal INC is transmitted to one input of control device 21, which retransmits said signal to the incrementation inputs of vertical and horizontal counters 15, 16, when signal INC is validated by control amplifiers 20 receiving the control signals from the external computer by bus 23. The validation of the incrementation signal by control device 21 therefore makes it possible to implicitly address samples in accordance with four different modes, namely a mode where there is no incrementation of address counters 15, 16, a mode in which only horizontal address counter 16 is incremented, a mode where only vertical address counter 15 is incremented and a mode in which the horizontal and vertical counters 15, 16 are simultaneously incremented. In the case where there is no incrementation, the device always samples the same point of the image, either one point per frame or one point per image. In the case where only the horizontal address of the image point is incremented by counter 16, the device analyzes one line at a rate of one point per image, the line address being indicated by the content of counter 15. In the case of a vertical incrementation only, the device analyzes a vertical line, whose address corresponds to the content of the horizontal counter 16 and this analysis takes place at a rate of one point per line. In the case of horizontal and vertical incrementation, the device analyzes an oblique line at a rate of one point per line and the addresses of the successive points analyzed are indicated by the content of counters 15 and 16.

Thus, the addressing device permits more accurate uses of an analog-digital converter than the prior art real time converters, because the analysis of an image point always takes place at the speed of the frame or line sync signals, which represent a relatively slow conversion rate and consequently explains the high characterization accuracy which can be obtained.

The aforementioned implicit addressing is carried out by address counters 15, 16 and is completed by an explicit addressing carried out by control device 21, which will more particularly be used for characterizations of conventional or standardized signals in television signals, particularly for the characterization of parameters of test signals inserted in frame erasing at lines 17, 18, 300 and 331.

Although the device described hereinbefore more particularly applies to the characterization of television signals, it is obvious that it can be used in other signal characterization systems and can easily be inserted among other constituents of a computer-assisted measuring or characterization system. In this case the operation of the device is determined by a characterization or measuring programme, which will determine the total or fragmentary acquisition parameters of the signals necessary for performing the task taking place. For example, this programme will determine the horizontal and vertical address of the starting point of the signals to be acquired, the number of points to be acquired, the acquisition conditions and the acquisition trajectory. The computer will then pass the control parameters to the device which will arrange them in the corresponding control registers. The device will acquire the requested data and progressively transmit them to the computer, which will arrange or accumulate them in its central memory and will stop the process when the data are completely transferred.

Although the principles of the invention have been described hereinbefore with reference to a specific embodiment, it is clear that the invention is not limited thereto and in fact covers all variants thereof.

What is claimed is :

1. Apparatus for the selective acquisition of television signals representing in each case a luminance and chrominance state of a point of a television image and for providing information as to said signal to a digital computer comprising:
   a current address generator constituted by a first counter advancing at the timing of the sampling times of the current point being scanned in said image in order to give the address of the current point on a television image scanning line and a second counter advancing with the timing of the television signal line sync. Signals in order to give the line address of the current point of said scanned image;
   a sampling unit for sampling the television signals inputed into said apparatus, incorporating a first register for storing the address of the point of the line to be sampled and a second register for storing the line address of the point to be sampled, which are respectively coupled to a first and second programmable counters which can be respectively loaded by the content of first and second storage registers of the point to be sampled;
   a comparison device comprising;
     a first comparator connected at a first input to the first counter of said current address generator and connected at a second input to the output of the first programmable counter of said sampling unit,
     a second comparator connected to the second counter of the current address generator and connected to the second counter of the current address generator and connected to the second programmable counter of the sampling unit in order to detect equality between the address of the current point and the address of the desired point contained in the first and second programmable counters and to provide an authorization signal;
   a means coupled to said comparison device and said sampler unit for controlling said sampler unit in accordance with said authorization signal provided by said comparison device;
   an analog to digital converter having a conversion cycle and being coupled to said sampling unit for converting the amplitude of the sample generated by the sampling unit into a digital quantity and for supplying signals for the incrementation, by one unit, the content of the first and second programmable counters at the end of each conversion cycle;
   and a control device, controlled by said computer and addressed by the current address in order to supply programmed control signals to the sampling unit.

2. An apparatus according to claim 1, wherein the signals for incrementing the content of the first and second programmable counters are validated by control device.

3. An apparatus according to claim 2 wherein the sampling unit further comprises:
   a network for processing the received signals coupled between the sampling unit and an input of the apparatus, said processing consisting of means for attenuating and/or filtering the signal before its transmission to the sampling unit for bringing to size of television signal.

* * * * *